US010964135B2

United States Patent
Takahashi (10) Patent No.: US 10,964,135 B2
(45) Date of Patent: Mar. 30, 2021

(54) IN-VEHICLE ELECTRONIC CONTROL UNIT AND METHOD FOR ABNORMALITY RESPONSE PROCESSING THEREOF

(71) Applicant: Hitachi Automotive Systems, Ltd., Hitachinaka (JP)

(72) Inventor: Toshihiro Takahashi, Isesaki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/647,429

(22) PCT Filed: Mar. 23, 2018

(86) PCT No.: PCT/JP2018/011679
§ 371 (c)(1),
(2) Date: Mar. 13, 2020

(87) PCT Pub. No.: WO2019/058607
PCT Pub. Date: Mar. 28, 2019

(65) Prior Publication Data
US 2020/0273267 A1 Aug. 27, 2020

(30) Foreign Application Priority Data

Sep. 22, 2017 (JP) .............................. JP2017-181933

(51) Int. Cl.
*G07C 5/00* (2006.01)
*G01M 15/00* (2006.01)
(Continued)

(52) U.S. Cl.
CPC ........... *G07C 5/0808* (2013.01); *G07C 5/008* (2013.01); *G07C 5/085* (2013.01)

(58) Field of Classification Search
None
See application file for complete search history.

(56) References Cited

U.S. PATENT DOCUMENTS 4,386,427 A * 5/1983 Hosaka ................. F02D 41/266
  701/114
5,276,619 A * 1/1994 Ohara ..................... F02D 41/22
  123/479
(Continued)

FOREIGN PATENT DOCUMENTS

JP  2004-62392 A   2/2004
JP  2011-248390 A  12/2011
(Continued)

OTHER PUBLICATIONS

Japanese-language Office Action issued in Japanese Application No. 2017-181933 dated May 12, 2020 with partial English translation (five pages).

(Continued)

*Primary Examiner* — Adam D Tissot
(74) *Attorney, Agent, or Firm* — Crowell & Moring LLP (57) ABSTRACT

A control circuit configured to control an actuator mounted in a vehicle performs a self-diagnostic procedure. A monitoring circuit is configured to monitor an operating state of the control circuit based on diagnostic information resulting from the self-diagnostic procedure. When determining that the control circuit operates abnormally, the monitoring circuit blocks a control signal output from the control circuit to the actuator and outputs a reset signal to initialize the control circuit while maintaining the diagnostic information resulting from the self-diagnostic procedure in a RAM. Furthermore, when a predetermined condition is further satisfied, the monitoring circuit stops outputting the reset signal, thereby restarting the control circuit so that the control circuit performs abnormality response processing.

6 Claims, 5 Drawing Sheets

(51) Int. Cl.
*G06F 7/00* (2006.01)
*G06F 11/00* (2006.01)
*G06F 11/30* (2006.01)
*G07C 5/08* (2006.01)

(56) References Cited

U.S. PATENT DOCUMENTS

| | | | | |
|---|---|---|---|---|
| 7,446,428 B2* | 11/2008 | Sugimura | .......... | G01R 31/3278 307/10.6 |
| 8,954,219 B2* | 2/2015 | Kobayashi | .......... | G07C 5/0808 701/29.2 |
| 2018/0202544 A1 | 7/2018 | Okubo | | |

FOREIGN PATENT DOCUMENTS

| | | |
|---|---|---|
| JP | 2016-142141 A | 8/2016 |
| WO | WO 2017/056688 A1 | 4/2017 |

OTHER PUBLICATIONS

International Search Report (PCT/ISA/210) issued in PCT Application No. PCT/JP2018/011679 dated Jun. 26, 2018 with English translation (three (3) pages).

Japanese-language Written Opinion (PCT/ISA/237) issued in PCT Application No. PCT/JP2018/011679 dated Jun. 26, 2018 (three (3) pages).

Japanese-language International Preliminary Report on Patentability (PCT/IPEA/409) issued in PCT Application No. PCT/JP2018/011679 dated Aug. 29, 2019 with English translation (eight (8) pages).

* cited by examiner

IN-VEHICLE ELECTRONIC CONTROL UNIT AND METHOD FOR ABNORMALITY RESPONSE PROCESSING THEREOF

TECHNICAL FIELD

The present invention relates to an in-vehicle electronic control unit and to a method for abnormality response processing thereof.

BACKGROUND ART

A known example of conventional in-vehicle electronic control units includes a control circuit (main CPU) for controlling an actuator mounted in a vehicle and a monitoring circuit (sub-CPU) for monitoring the operation of the control circuit, as disclosed in Patent Document 1. In such a conventional in-vehicle electronic control unit, when the monitoring circuit detects an abnormality in the control circuit, the monitoring circuit stops power supply to the actuator and transmits an abnormality detection signal to the control circuit. Then, after the control circuit stores, into a non-volatile memory, data related to its control processing in response to the reception of the abnormality detection signal, the monitoring circuit stops power supply to the control circuit and the monitoring circuit.

REFERENCE DOCUMENT LIST

Patent Document

Patent Document 1: JP 2004-062392 A

SUMMARY OF THE INVENTION

Problem to be Solved by the Invention

The control circuit may sometimes store abnormality information in the non-volatile memory in response to the reception of the abnormality detection signal. However, after power supply to the control circuit and the monitoring circuit is stopped in a first in-vehicle electronic control unit, communication for exchanging such abnormality information is disabled between the first in-vehicle electronic control unit and a second in-vehicle electronic control unit for controlling another actuator mounted in the vehicle. In this case, the second in-vehicle electronic control unit cannot identify the occurrence of the abnormality in the first in-vehicle electronic control unit. Thus, the second in-vehicle electronic control unit is unable to control its corresponding actuator so as to respond to the abnormality of the first in-vehicle electronic control unit, and this may adversely affect the driving safety of the vehicle.

In view of the above problem, the present invention has been made to achieve an object to provide an in-vehicle electronic control unit having an improved function to notify external entities of an abnormality of the in-vehicle electronic control unit and a method for abnormality response processing thereof.

Means for Solving the Problem

To this end, an in-vehicle electronic control unit according to an aspect of the present invention comprises: a control circuit configured to control an actuator mounted in a vehicle and to perform a self-diagnostic procedure; a monitoring circuit configured to monitor an operating state of the control circuit based on diagnostic information resulting from the self-diagnostic procedure; and a relay controlled by the monitoring circuit and configured to be able to block a control signal output from the control circuit to the actuator. The monitoring circuit is configured so that, when determining that the control circuit operates abnormally, the monitoring circuit blocks the control signal output from the control circuit to the actuator and initializes the control circuit while maintaining the diagnostic information resulting from the self-diagnostic procedure, and restarts the control circuit so that the control circuit performs abnormality response processing when a predetermined condition is further satisfied. The abnormality response processing includes: acquiring the diagnostic information from the monitoring circuit and storing the diagnostic information into a first non-volatile memory connected to the control circuit; and performing communication with an external entity.

An in-vehicle electronic control unit according to another aspect of the present invention comprises: a control circuit configured to control an actuator mounted in a vehicle and to perform a self-diagnostic procedure; a monitoring circuit configured to monitor an operating state of the control circuit based on diagnostic information resulting from the self-diagnostic procedure; and a relay controlled by the monitoring circuit and configured to be able to block a control signal output from the control circuit to the actuator. The monitoring circuit is configured so that, when determining that the control circuit operates abnormally, the monitoring circuit blocks the control signal and initializes the control circuit while maintaining the diagnostic information in a volatile memory, and the monitoring circuit restarts the control circuit so that the control circuit performs abnormality response processing when a predetermined condition is further satisfied, and does not restart the control circuit and stores the diagnostic information into a second non-volatile memory included in or connected to the monitoring circuit when the predetermined condition is not satisfied.

A method for abnormality response processing of an in-vehicle electronic control unit, according to another aspect of the present invention comprises: causing a control circuit configured to control an actuator mounted in a vehicle to perform a self-diagnostic procedure; causing, when a monitoring circuit configured to monitor an operating state of the control circuit based on diagnostic information resulting from the self-diagnostic procedure determines that the control circuit operates abnormally, the monitoring circuit to block a control signal output from the control circuit to the actuator and to initialize the control circuit while maintaining the diagnostic information resulting from the self-diagnostic procedure; and causing the monitoring circuit to restart the control circuit and causing the control circuit to perform abnormality response processing when a predetermined condition is further satisfied. The abnormality response processing includes: acquiring the diagnostic information from the monitoring circuit and storing the diagnostic information into a first non-volatile memory connected to the control circuit; and performing communication with an external entity.

A method for abnormality response processing of an in-vehicle electronic control unit, according to another aspect of the present invention comprises: causing a control circuit configured to control an actuator mounted in a vehicle to perform a self-diagnostic procedure; causing, when a monitoring circuit configured to monitor an operating state of the control circuit based on diagnostic information resulting from the self-diagnostic procedure determines that the control circuit operates abnormally, the monitoring circuit to block a control signal output from the control circuit to the actuator and to initialize the control circuit while maintaining the diagnostic information; and causing the monitoring circuit to restart the control circuit and causing the control circuit to perform abnormality response processing when a predetermined condition is further satisfied, and causing the monitoring circuit not to restart the control circuit and to store the diagnostic information into a second non-volatile memory included in or connected to the monitoring circuit when the predetermined condition is not satisfied.

Effects of the Invention

The in-vehicle electronic control unit and the method for abnormality response processing thereof according to the present invention provides an improved function to notify external entities of an abnormality of the in-vehicle electronic control unit.

MODE FOR CARRYING OUT THE INVENTION

Figure 1:
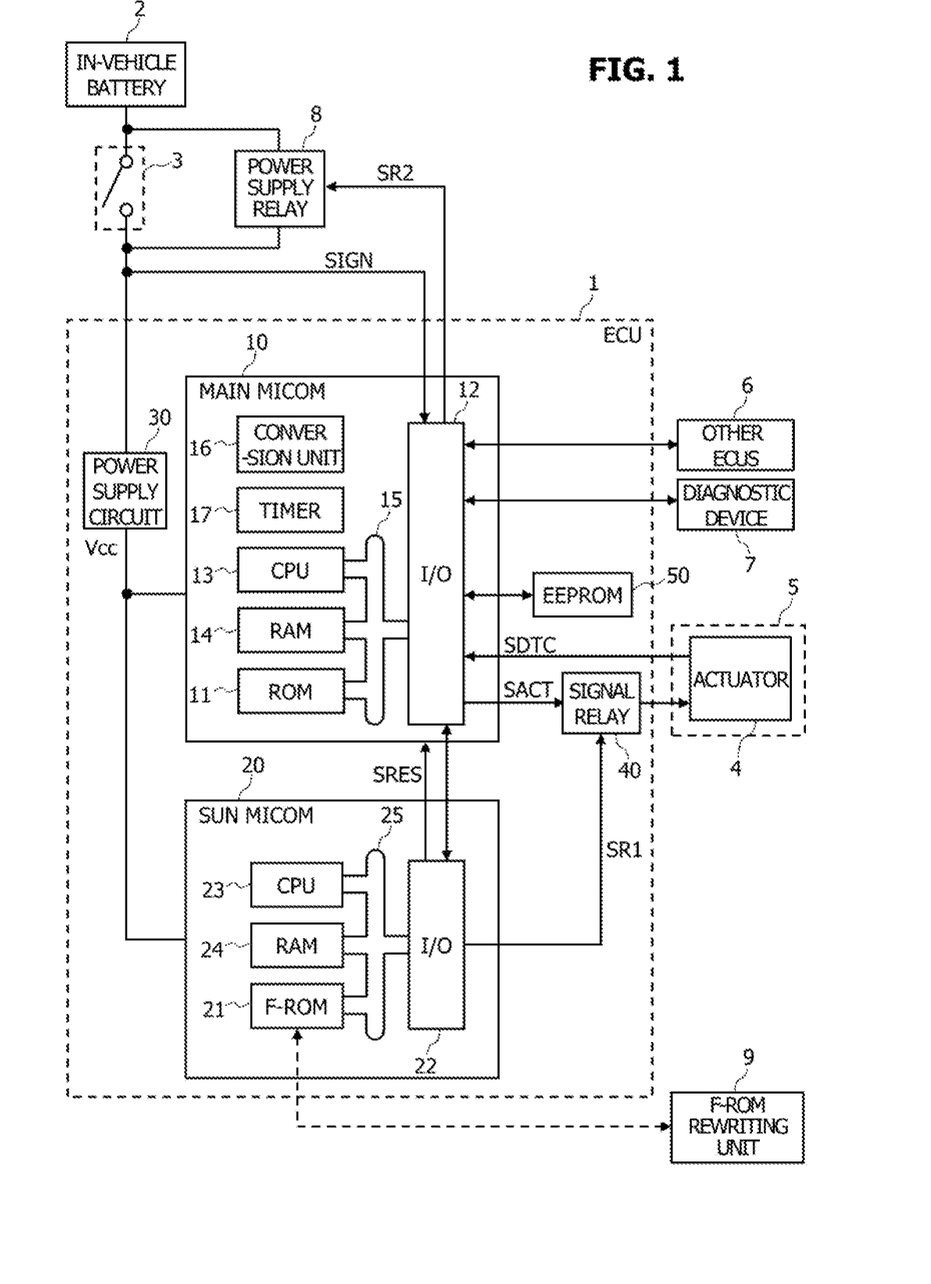
FIG. 1 is a block diagram of an example of an in-vehicle electronic control unit according to an embodiment of the present invention.

Hereinafter, an embodiment of the present invention will be described in detail with reference to the accompanying drawings. FIG. 1 shows an example of an in-vehicle electronic control unit according to an embodiment of the present invention.

An in-vehicle electronic control unit (hereinafter "ECU") 1 has a built-in computer, and receives power supply from an in-vehicle battery 2 via an ignition switch 3 to control an actuator 4 mounted in a vehicle. Actuator 4 is mounted in the vehicle as an actuator for shifting gears (gear ratios) in a transmission mechanism 5. Note that vehicle-mounted actuator 4 may be used not only as an actuator of transmission mechanism 5 but also as an actuator of any of various in-vehicle mechanisms such as a variable valve timing mechanism and a variable compression ratio mechanism of an internal combustion engine, a braking mechanism, and a steering assist mechanism.

ECU 1 includes a main control microcomputer (hereinafter "main microcomputer", abbreviated as "MAIN MICOM" in the drawings) 10 and a monitoring microcomputer (hereinafter "sub-microcomputer", abbreviated as "SUB-MICOM" in the drawings) 20. Main microcomputer 10 serves as a control circuit for controlling actuator 4. Sub-microcomputer 20 serves as a monitoring circuit for monitoring an operating state of main microcomputer 10.

ECU 1 further includes a power supply circuit 30, a signal relay 40, and an electrically erasable programmable read-only memory (EEPROM) 50. Power supply circuit 30 is configured to adjust the power supplied from in-vehicle battery 2 via ignition switch 3 so that a power supply voltage Vcc is supplied to main microcomputer 10 and sub-microcomputer 20. Signal relay 40 is configured to electrically connect and disconnect main microcomputer 10 to and from actuator 4 in response to an external control signal SR1. EEPROM 50 is a first non-volatile memory that is electrically rewritable and configured to retain stored information even after it is powered off.

Main Microcomputer

Main microcomputer 10 includes a read only memory (ROM) 11, an input/output unit (abbreviated as "I/O" in the drawings) 12, a central processing unit (CPU) 13, and a random access memory (RAM) 14. ROM 11 is non-volatile. Input/output unit 12 is an interface for inputting and outputting signals from and to the outside. CPU 13 serves as an arithmetic unit. RAM 14 is volatile. ROM 11, input/output unit 12, CPU 13, and RAM 14 are connected to each other through an internal bus 15. Main microcomputer 10 is configured to be initialized by the receipt of a reset signal SRES output from sub-microcomputer 20.

ROM 11 stores two programs: a program for normal state and a program for abnormal state. The program for normal state is a control processing program for causing CPU 13 to execute various control processes when main microcomputer 10 operates normally. The program for abnormal state is adapted to be executed when main microcomputer 10 operates abnormally and a predetermined condition is satisfied. The predetermined condition will be further described later.

Input/output unit 12 is configured to output a control signal SACT to actuator 4 of transmission mechanism 5 and to receive a measurement signal SDTC from a sensor (not shown) configured to measure a control variable of actuator 4. Input/output unit 12 is further configured to enable main microcomputer 10 to communicate with other ECUs 6, a diagnostic device 7, and sub-microcomputer 20. ECUs 6 are configured to control actuators of in-vehicle mechanisms other than transmission mechanism 5. Diagnostic device 7 is external and connected to the vehicle and is configured to diagnose the vehicle system including ECU 1. Input/output unit 12 is further configured to input and output data from and to EEPROM 50 connected to main microcomputer 10.

CPU 13 is configured to perform normal-state processing when main microcomputer 10 operates normally. The normal-state processing includes actuator control and an abnormality diagnostic procedure (self-diagnostic procedure) on main microcomputer 10, and CPU 13 performs this normal-state processing by loading the program for normal state from ROM 11 to RAM 14 and executing the program.

As the actuator control, CPU 13 controls actuator 4 of transmission mechanism 5 based on an operation signal (not shown) input by the driver's operation of the shift lever and received through input/output unit 12 as well as based on the measurement signal SDTC received from actuator 4 through input/output unit 12. Specifically, CPU 13 specifies a target control variable for actuator 4 based on the operation signal, and calculates a control variable measurement of actuator 4 based on the measurement signal SDTC. Then, CPU 13 calculates an operation variable for actuator 4 based on a deviation between the target control variable and the control variable measurement, and outputs, to actuator 4 through input/output unit 12, the control signal (such as a pulse width modulation signal) SACT according to the operation variable.

Furthermore, as the abnormality diagnostic procedure on main microcomputer 10, CPU 13 diagnoses whether main microcomputer 10 operates abnormally, at a predetermined timing during the actuator control or before/after the start of the actuator control, and CPU 13 transmits, to sub-microcomputer 20, diagnostic information resulting from the abnormality diagnostic procedure. When CPU 13 determines that main microcomputer 10 operates normally, diagnostic information indicating that main microcomputer 10 operates normally is temporarily stored in RAM 14 (hereinafter, such diagnostic information will be referred to as "normality information"). Then, in self shut-off processing, CPU 13 writes the normality information into EEPROM 50. The self shut-off processing will be further described later.

On the other hand, when CPU 13 determines that main microcomputer 10 operates abnormally and the predetermined condition, which will be described later, is satisfied, CPU 13 performs abnormality response processing by loading the program for abnormal state from ROM 11 to RAM 14 and executing the program. The abnormality response processing includes abnormality response information storing and abnormality response communication. As the abnormality response information storing, CPU 13 receives, from sub-microcomputer 20, diagnostic information indicating that main microcomputer 10 operates abnormally (hereinafter, such diagnostic information will be referred to as "abnormality information") and stores the abnormality information into EEPROM 50. As the abnormality response communication, CPU 13 performs communication with external devices such as ECUs 6 and diagnostic device 7.

In addition, main microcomputer 10 further includes a conversion unit 16 having an analog-to-digital (A/D) converter and a digital-to-analog (D/A) converter. The A/D converter is configured to convert, to a digital signal, the analog, measurement signal SDTC input to main microcomputer 10. The D/A converter is configured to convert, to an analog signal, the digital, control signal SACT output from main microcomputer 10. In addition, main microcomputer 10 further includes a timer 17 as a time measuring means for various control processes.

Sub-Microcomputer

Sub-microcomputer 20 includes a flash ROM (abbreviated as "F-ROM" in the drawings) 21, an input/output unit 22, a CPU 23, a RAM 24, which are connected to each other through an internal bus 25. Sub-microcomputer 20 is configured to output the reset signal SRES to main microcomputer 10 through input/output unit 22.

Flash ROM 21 is a second non-volatile memory that is electrically rewritable and configured to maintain stored information even after it is powered off. Flash ROM 21 stores, in advance, a control processing program for causing CPU 23 to execute various control processes. In this embodiment, data is input and output from and to flash ROM 21 through input/output unit 22. Alternatively, however, flash ROM 21 may be external and connected to sub-microcomputer 20.

Input/output unit 22 is configured to enable sub-microcomputer 20 to communicate with main microcomputer 10 and to output the control signal SR1 to signal relay 40.

CPU 23 is configured to monitor the operating state of main microcomputer 10 based on the diagnostic information received from main microcomputer 10 through input/output unit 22, by loading the control processing program from flash ROM 21 to RAM 24 and executing the program.

When determining that main microcomputer 10 operates abnormally, CPU 23 outputs, to signal relay 40, the control signal SR1 for blocking the control signal SACT output from main microcomputer 10 to actuator 4, and outputs the reset signal SRES to main microcomputer 10, while maintaining the diagnostic information (abnormality information) in RAM 24.

Furthermore, when main microcomputer 10 operates abnormally but still has the ability to perform the abnormality response processing (hereinafter, such a state of main microcomputer 10 will be referred to as "processing-executable abnormal state"), CPU 23 determines that the predetermined condition is satisfied. In this case, CPU 23 stops outputting the reset signal SRES, and restarts main microcomputer 10 so that main microcomputer 10 performs the abnormality response processing as described above. On the other hand, when main microcomputer 10 operates abnormally and loses the ability to perform the abnormality response processing (hereinafter, such a state of main microcomputer 10 will be referred to as "processing-inexecutable abnormal state"), CPU 23 determines that the predetermined condition is not satisfied. In this case, CPU 23 continues to output the reset signal SRES so as not to restart main microcomputer 10. As such, CPU 13 of main microcomputer 10 does not perform the abnormality response processing, and thus, is unable to write the abnormality information into EEPROM 50. Accordingly, CPU 23 stores the abnormality information into flash ROM 21 instead.

Self Shut-Off Function

ECU 1 has a self shut-off function. As used herein, the "self shut-off function" refers to a function to continue to supply the power supply voltage to main microcomputer 10 and sub-microcomputer 20 through power supply circuit 30 even after ignition switch 3 is turned off and stop supplying the power supply voltage when a predetermined time has elapsed since ignition switch 3 is turned off. As used herein, "self shut-off processing" refers collectively to various processes performed during the predetermined time from when ignition switch 3 is turned off.

Specifically, in main microcomputer 10, CPU 13 is configured to detect that ignition switch 3 is turned off based on a detection signal SIGN corresponding to a voltage between ignition switch 3 and power supply circuit 30 and received through input/output unit 12. When detecting that ignition switch 3 is turned off, CPU 13 outputs, to a power supply relay 8 through input/output unit 12, a control signal SR2 for turning on power supply relay 8, thereby continuing the supply of the power supply voltage from in-vehicle battery 2 to power supply circuit 30 through a path that does not go through ignition switch 3. After that, when CPU 13 determines that the time that timer 17 measures from when CPU 13 detects that ignition switch 3 is turned off has reached the predetermined time, CPU 13 outputs, to power supply relay 8, the control signal SR2 for turning off power supply relay 8. By doing so, CPU 13 stops the supply of the power supply voltage to power supply circuit 30, and eventually to main microcomputer 10 and sub-microcomputer 20.

Control Processing Performed by Main Microcomputer

Figure 2:
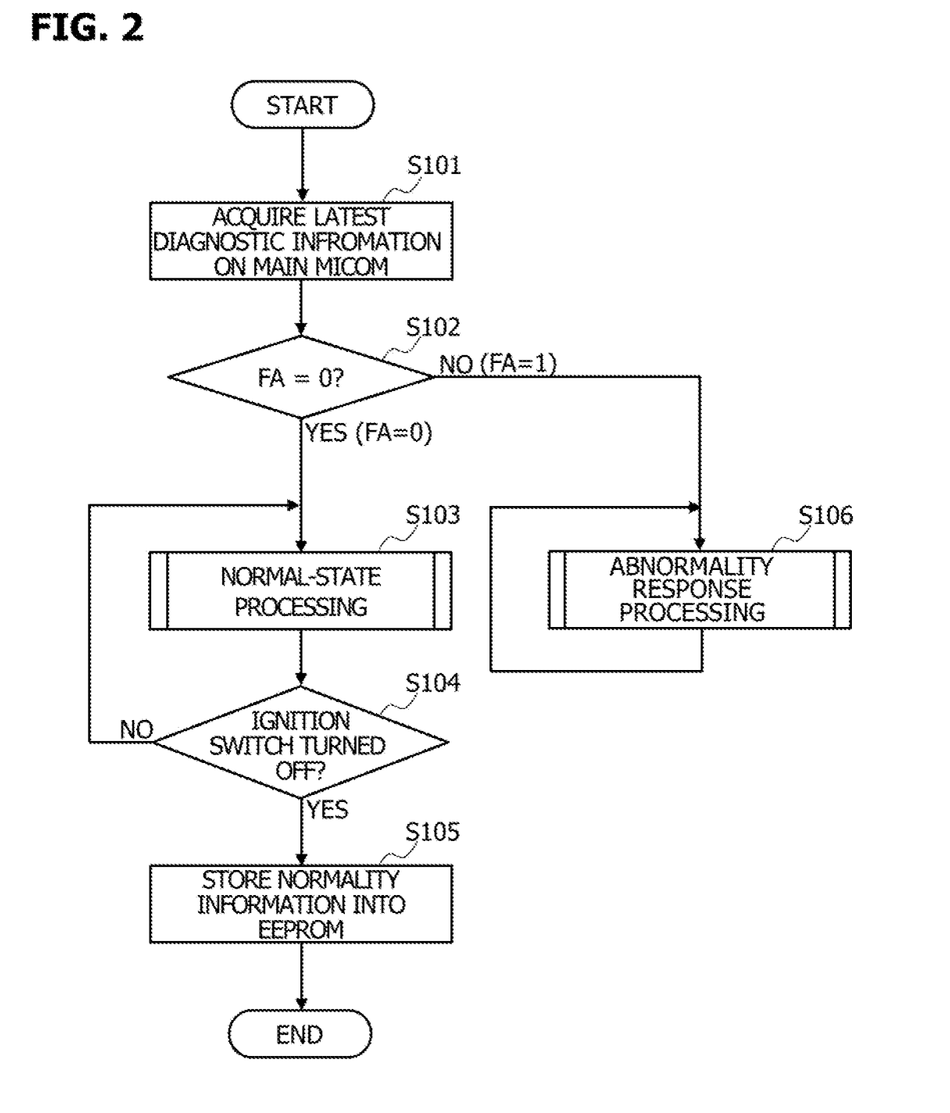
FIG. 2 is a flowchart of processing performed by a main microcomputer of the in-vehicle electronic control unit.

FIG. 2 shows a main routine of control processing performed by CPU 13 of main microcomputer 10, which is triggered when any one of the following two conditions is satisfied: (1) Ignition switch 3 is turned on and the power supply voltage starts to be supplied from power supply circuit 30 to main microcomputer 10 and sub-microcomputer 20; and (2) Sub-microcomputer 20 stops outputting the reset signal SRES to main microcomputer 10 and main microcomputer 10 is restarted.

In step S101 (abbreviated as "S101" in FIG. 1, the same applies to the other steps below), CPU 13 of main microcomputer 10 acquires the latest diagnostic information on main microcomputer 10. Specifically, through input/output unit 12, CPU 13 of main microcomputer 10 acquires the latest diagnostic information on main microcomputer 10 from EEPROM 50 or, flash ROM 21 or RAM 24 of sub-microcomputer 20.

Assume here the case in which CPU 13 determines that main microcomputer 10 operates abnormally as a result of the abnormality diagnostic procedure on main microcomputer 10. In this case, the abnormality information is temporarily stored in RAM 24 and then transferred and stored into EEPROM 50 or into flash ROM 21. However, CPU 13 is configured not to perform the abnormality diagnostic procedure and not to store any further diagnostic information until the abnormality information stored in EEPROM 50 or flash ROM 21 is overwritten with the normality information. As such, if the abnormality information is stored finally in EEPROM 50 or flash ROM 21 or temporarily in RAM 24, the abnormality information is the latest diagnostic information on main microcomputer 10. On the other hand, if the abnormality information is not finally or temporarily stored in any of EEPROM 50, flash ROM 21, and RAM 24, the normality information, which indicates that main microcomputer 10 operates normally, is the latest diagnostic information on main microcomputer 10. The diagnostic information includes an operating state flag FA. The operating state flag FA indicates the operating state of main microcomputer 10 and will be further described later.

Assume the case in which CPU 13 determines that main microcomputer 10 is in the processing-executable abnormal state. In this case, the abnormality information is temporarily stored in RAM 24 of sub-microcomputer 20. Then, after main microcomputer 10 is restarted, main microcomputer 10 performs the abnormality response processing, and thereby transfers and stores the abnormality information from RAM 24 into EEPROM 50. Thus, if CPU 13 performs the control processing triggered by the turning on of ignition switch 3, the abnormality information stored in EEPROM 50 is acquired as the latest diagnostic information on main microcomputer 10 in step S101. However, if CPU 13 performs the control processing triggered by the restart of main microcomputer 10, the abnormality information temporarily stored and maintained in RAM 24 of sub-microcomputer 20 is acquired as the latest diagnostic information on main microcomputer 10 in step S101.

Next, assume the case in which CPU 13 determines that main microcomputer 10 is in the processing-inexecutable abnormal state. In this case, the abnormality information is stored in flash ROM 21 of sub-microcomputer 20. Thus, if CPU 13 performs the control processing triggered by the turning on of ignition switch 3, the abnormality information stored in flash ROM 21 of sub-microcomputer 20 is acquired as the latest diagnostic information on main microcomputer 10 in step S101. Note that when CPU 13 determines that main microcomputer 10 is in the processing-inexecutable abnormal state, main microcomputer 10 will not be restarted. Thus, naturally, the control processing starting from step S101 would not be triggered by the restart of main microcomputer 10 in this case.

In step S102, based on the diagnostic information acquired in step S101, CPU 13 of main microcomputer 10 determines whether the operating state flag FA has a value indicating that main microcomputer 10 operates normally (FA=0, for example). When CPU 13 of main microcomputer 10 determines that the operating state flag FA has the value indicating that main microcomputer 10 operates normally (FA=0, YES), the operation proceeds to step S103. When CPU 13 of main microcomputer 10 determines that the operating state flag FA has the value indicating that main microcomputer 10 operates abnormally (FA=1, NO), the operation proceeds to step S106.

In step S103, CPU 13 of main microcomputer 10 loads the program for normal state from ROM 11 to RAM 14 and performs normal-state processing. The normal-state processing will be further described later.

In step S104, based on the detection signal SIGN received through input/output unit 12, CPU 13 of main microcomputer 10 determines whether ignition switch 3 is turned off. When determining that ignition switch 3 is turned off (YES), CPU 13 of main microcomputer 10 outputs, to power supply relay 8, the control signal SR2 for turning on power supply relay 8. Then, the operation proceeds to step S105 and CPU 13 performs the self shut-off processing. When CPU 13 of main microcomputer 10 determines that ignition switch 3 is not turned off (NO), the operations returns to step S101 and CPU 13 acquires the latest diagnostic information.

In step S105, CPU 13 of main microcomputer 10 performs the self shut-off processing, thereby transferring and storing the normality information from RAM 14 into EEPROM 50 through input/output unit 12. Here, the normality information has been temporarily stored in RAM 14 as a result of the abnormality diagnostic procedure in the normal-state processing. CPU 13 outputs, to power supply relay 8, the control signal SR2 for turning off power supply relay 8 when the predetermined time has elapsed since ignition switch 3 is turned off.

In step S106, CPU 13 of main microcomputer 10 loads the program for abnormal state from ROM 11 to RAM 14 and performs abnormality response processing. CPU 13 of main microcomputer 10 iteratively performs the abnormality response processing until CPU 13 of main microcomputer 10 detects that ignition switch 3 is turned off based on the detection signal SIGN. The abnormality response processing will be further described later.

Normal-State Processing

Figure 3:
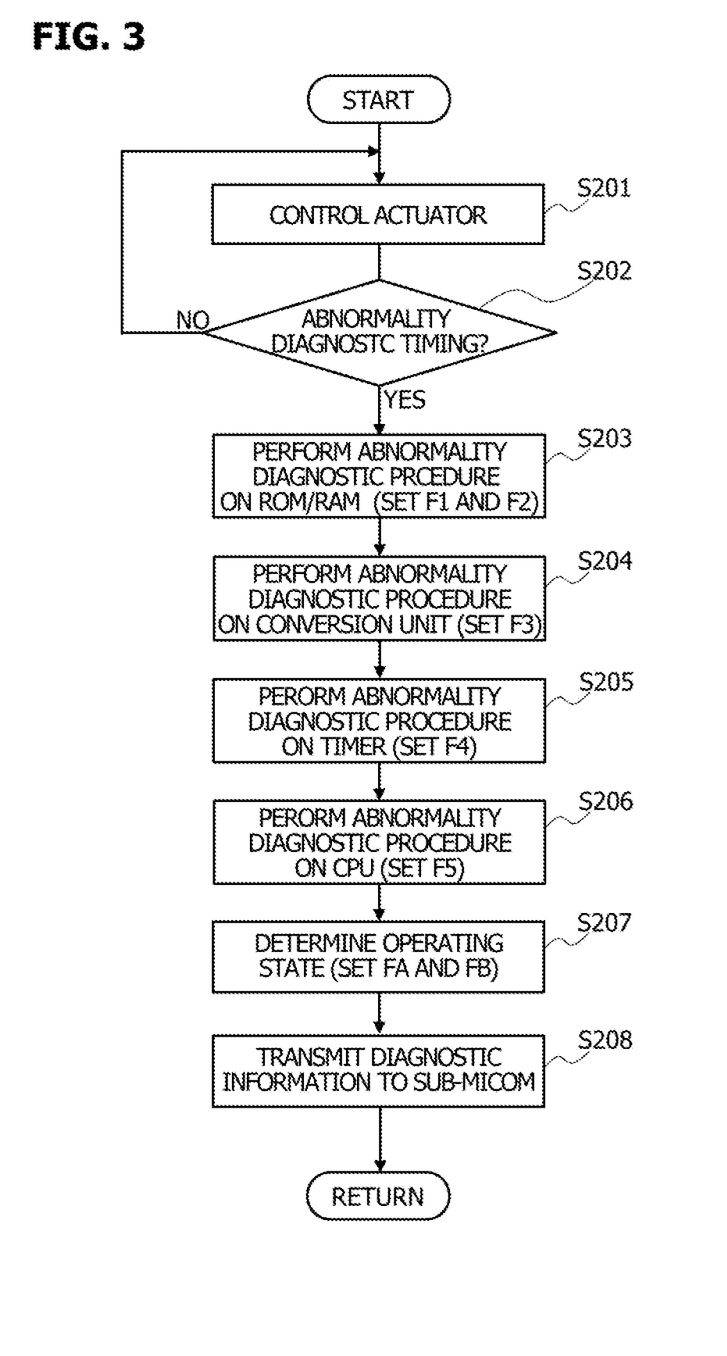
FIG. 3 is a flowchart of normal-state processing in FIG. 2.

FIG. 3 shows a normal-state processing subroutine in step S103 of the main routine of the control processing performed by CPU 13 of main microcomputer 10.

In step S201, CPU 13 of main microcomputer 10 controls actuator 4 (performs the actuator control). Specifically, CPU 13 of main microcomputer 10 calculates a deviation between the target control variable (such as a target electric-current value) and the control variable measurement (such as an electric-current measurement) by feeding back the control variable measurement, and calculates the operation variable of actuator 4 based on the deviation. CPU 13 outputs, to actuator 4 through input/output unit 12, the control signal (such as a pulse width modulation signal) SACT according to the operation variable.

In step S202, CPU 13 of main microcomputer 10 determines whether it is time to perform the abnormality diagnostic procedure (whether it is abnormality diagnostic timing). The abnormality diagnostic timing is defined appropriately so as not to affect the control of actuator 4. For example, the abnormality diagnostic timing may be defined to take place at a time when transmission mechanism 5 is expected to be relatively less often operated, such as when the vehicle stops. When CPU 13 of main microcomputer 10 determines that it is the abnormality diagnostic timing (YES), the operation proceeds to step S203. When CPU 13 of main microcomputer 10 determines that it is not the abnormality diagnostic timing (NO), the operation returns to step S201 and CPU 13 continues to control actuator 4.

In step S203, CPU 13 of main microcomputer 10 performs an abnormality diagnostic procedure on ROM 11 and RAM 14 to determine whether ROM 11 and/or RAM 14 have an abnormality. Various well-known diagnostic methods may be applicable to the abnormality diagnostic procedure on ROM 11 and RAM 14, and it is not an object of the present invention to provide such a method. Accordingly, the detailed description thereof will be omitted. However, for example, CPU 13 of main microcomputer 10 may perform the abnormality diagnostic procedure on ROM 11 by sequentially reading data sets from the addresses of ROM 11, generating a cyclic redundancy check (CRC) code from each read data set, and comparing the generated CRC code with an expected CRC code stored in advance. The abnormality diagnostic procedure on RAM 14 may be performed by writing and reading constant data to and from each address of RAM 14 and determining whether the read value matches with the write value, for example. When CPU 13 of main microcomputer 10 diagnoses that ROM 11 have an abnormality, CPU 13 sets an ROM abnormality flag F1 to a value indicating the abnormality of ROM 11 (F1=1, for example). When CPU 13 of main microcomputer 10 diagnoses that RAM 14 have an abnormality, CPU 13 sets a RAM abnormality flag F2 to a value indicating the abnormality of RAM 14 (F2=1, for example).

In step S204, CPU 13 of main microcomputer 10 performs an abnormality diagnostic procedure on conversion unit 16 including the A/D converter and the D/A converter to determine whether conversion unit 16 has an abnormality. Various well-known diagnostic methods may be applicable to the abnormality diagnostic procedure on the A/D converter and the like, and it is not an object of the present invention to provide such a method. Accordingly, the detailed description thereof will be omitted. However, for example, the abnormality diagnostic procedure on conversion unit 16 may be performed by using the A/D converter to convert a reference signal to a digital signal, and comparing the thus-obtained digital signal with an expected AD-converted digital signal for the reference signal stored in advance. When CPU 13 of main microcomputer 10 diagnoses that conversion unit 16 has an abnormality, CPU 13 sets a conversion abnormality flag F3 to a value indicating the abnormality of conversion unit 16.

In step S205, CPU 13 of main microcomputer 10 performs an abnormality diagnostic procedure on timer 17 to determine whether timer 17 has an abnormality. Various well-known diagnostic methods may be applicable to the abnormality diagnostic procedure on timer 17, and it is not an object of the present invention to provide such a method. Accordingly, the detailed description thereof will be omitted. However, assuming that timer 17 is hardware based, for example, CPU 13 of main microcomputer 10 may perform the abnormality diagnostic procedure on timer 17 by comparing time measured by timer 17 with time measured using software executed by CPU 13. When CPU 13 of main microcomputer 10 diagnoses that timer 17 has an abnormality, CPU 13 sets a timer abnormality flag F4 to a value indicating the abnormality of timer 17.

In step S206, CPU 13 of main microcomputer 10 performs an abnormality diagnostic procedure on CPU 13 to determine whether CPU 13 has an abnormality. Various well-known diagnostic methods may be applicable to the abnormality diagnostic procedure on CPU 13, and it is not an object of the present invention to provide a method for performing the abnormality diagnostic procedure on CPU 13. Accordingly, the detailed description thereof will be omitted. When CPU 13 diagnoses that CPU 13 has an abnormality, CPU 13 sets a CPU abnormality flag F5 to a value indicating the abnormality of CPU 13. Note that the abnormality diagnostic procedures in steps S203 to S206 may be performed in any suitable order.

In step S207, based on the values of the above five abnormality diagnostic flags: i.e., the ROM abnormality flag F1, the RAM abnormality flag F2, the conversion abnormality flag F3, the timer abnormality flag F4, and the CPU abnormality flag F5, CPU 13 of main microcomputer 10 determines the operating state of main microcomputer 10 in the following manner.

When each of these five abnormality diagnostic flags is set to the value indicating normality, CPU 13 of main microcomputer 10 determines that main microcomputer 10 operates normally, and sets the operating state flag FA for main microcomputer 10 to a value indicating that main microcomputer 10 operates normally (FA=0, for example). When at least one of these five abnormality diagnostic flags is set to the value indicating abnormality, CPU 13 of main microcomputer 10 determines that main microcomputer 10 operates abnormally, and sets the operating state flag FA to a value indicating that main microcomputer 10 operates abnormally (FA=1, for example).

When determining that main microcomputer 10 operates abnormally, CPU 13 of main microcomputer 10 further determines whether main microcomputer 10 is in the processing-executable abnormal state or in the processing-inexecutable abnormal state. Then, when determining that main microcomputer 10 is in the processing-executable abnormal state, CPU 13 of main microcomputer 10 sets an executable/inexecutable flag FB to a value indicating that main microcomputer 10 still has the ability to perform the abnormality response processing (FB=0, for example). When determining that main microcomputer 10 is in the processing-inexecutable abnormal state, CPU 13 of main microcomputer 10 sets the executable/inexecutable flag FB to a value indicating that main microcomputer 10 loses the ability to perform the abnormality response processing (FB=1, for example).

Here, based on whether at least one specific flag of the above five abnormality diagnostic flags is set to the value indicating abnormality, CPU 13 of main microcomputer 10 determines whether main microcomputer 10 is in the processing-executable abnormal state or in the processing-inexecutable abnormal state, and sets the executable/inexecutable flag FB accordingly.

For example, when the CPU abnormality flag F5 is set to the value indicating the abnormality of CPU 13, CPU 13 is likely to be unable to execute the program for abnormal state. In this case, no matter what values the other four abnormality diagnostic flags may have, CPU 13 of main microcomputer 10 may determine that main microcomputer 10 loses the ability to perform the abnormality response processing, and may set the executable/inexecutable flag FB to the value indicating that main microcomputer 10 loses the ability to perform the abnormality response processing (FB=1, for example). On the other hand, when the CPU abnormality flag F5 is set to the value indicating the normality of CPU 13, CPU 13 of main microcomputer 10 may set the executable/inexecutable flag FB to the value indicating that main microcomputer 10 still has the ability to perform the abnormality response processing (FB=0, for example).

In some cases, regardless of the value of the CPU abnormality flag F5, at least one of the ROM abnormality flag F1, the RAM abnormality flag F2, and the timer abnormality flag F4 may be set to the value indicating abnormality. In this case, CPU 13 of main microcomputer 10 may determine that main microcomputer 10 loses the ability to execute the program for abnormal state, and may set the executable/ inexecutable flag FB to 1.

When main microcomputer 10 operates abnormally, CPU 13 will not perform the normal-state processing including the control of actuator 4, so that conversion unit 16 is expected to perform neither A/D conversion of the measurement signal SDTC nor D/A conversion of the control signal SACT. Thus, CPU 13 of main microcomputer 10 may take no account of the value of the conversion abnormality flag F3 when determining whether main microcomputer 10 is in the processing-executable abnormal state or in the processing-inexecutable abnormal state and setting the executable/ inexecutable flag FB accordingly.

In some cases, based on the latest diagnostic information acquired in step S101, CPU 13 may be able to identify that ROM 11 has an abnormality in an area other than the area storing the program for abnormal state but has no abnormality in the area storing the program for abnormal state. In this case, CPU 13 may assume that the ROM abnormality flag F1 has the value indicating that ROM 11 operates normally, and CPU 13 may take it into account when determining whether main microcomputer 10 is in the processing-executable abnormal state or in the processing-inexecutable abnormal state and setting the executable/ inexecutable flag FB accordingly. In some cases, based on the latest diagnostic information on main microcomputer 10, CPU 13 may be able to identify that RAM 14 has no abnormality in the area storing the abnormality information. In this case, CPU 13 may assume that the RAM abnormality flag F2 has the value indicating that RAM 14 operates normally, and CPU 13 may take it into account when determining whether main microcomputer 10 is in the processing-executable abnormal state or in the processing-inexecutable abnormal state and setting the executable/ inexecutable flag FB accordingly.

In step S208, CPU 13 transmits, to sub-microcomputer 20 through input/output unit 12, the diagnostic information resulting from the abnormality diagnostic procedures in steps S203 to S207. This diagnostic information includes the operating state flag FA and the executable/inexecutable flag FB set in step S207 in addition to the five abnormality diagnostic flags, i.e., the ROM abnormality flag F1, the RAM abnormality flag F2, the conversion abnormality flag F3, the timer abnormality flag F4, and the CPU abnormality flag F5.

Abnormality Response Processing

Figure 4:
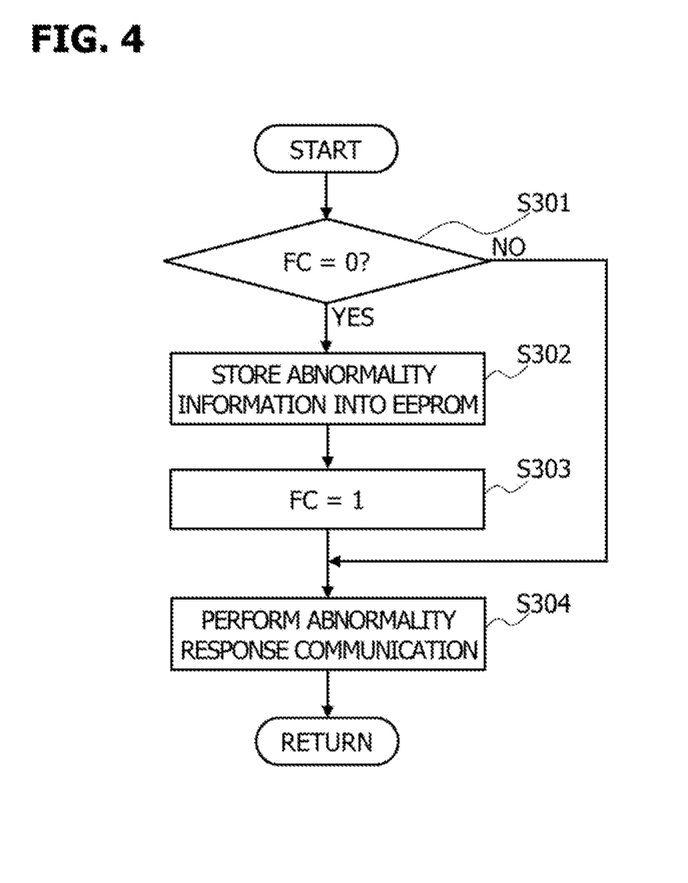
FIG. 4 is a flowchart of abnormality response processing in FIG. 2.

FIG. 4 shows the abnormality response processing subroutine in step S106 of the main routine of the control processing performed by CPU 13 of main microcomputer 10. It is assumed herein that when CPU 13 of main microcomputer 10 has not yet performed the abnormality response processing, a first execution flag FC is set to 0. The first execution flag FC will be further described below.

In step S301, CPU 13 of main microcomputer 10 determines whether the first execution flag FC has a value indicating that no abnormality information is stored in EEPROM 50 (FC=0, for example). Here, the first execution flag FC, which indicates whether abnormality information is stored in EEPROM 50, is stored in EEPROM 50 and read from EEPROM 50 every time the operation in step S301 is performed. When the first execution flag FC has the value indicating that the abnormality information has not yet been stored (FC=0, YES), the operation proceeds to step S302 so that CPU 13 stores the abnormality information in EEPROM 50. When the first execution flag FC has a value indicating that the abnormality information has already been stored (FC=1, NO), this indicates that the abnormality information has already stored as the latest diagnostic information in EEPROM 50. In this case, the operation skips steps S302 and S303 and proceeds to step S304.

In step S302, CPU 13 of main microcomputer 10 stores, as the latest diagnostic information into EEPROM 50, the abnormality information received from RAM 24 of sub-microcomputer 20 through input/output unit 12 in step S101 described above.

In step S303, CPU 13 of main microcomputer 10 sets the first execution flag FC to the value indicating that the abnormality information has already been stored in EEPROM 50 (FC=1).

In step S304, CPU 13 of main microcomputer 10 communicates with one or more external entities such as ECUs 6 or diagnostic device 7 through input/output unit 12 (performs the abnormality response communication). As the abnormality response communication, CPU 13 of main microcomputer 10 responds to an inquiry on the operating state of main microcomputer 10 from any of ECUs 6 and diagnostic device 7, by transmitting, to this relevant ECU 6 or diagnostic device 7 through input/output unit 12, either the abnormality information stored as the latest diagnostic information in EEPROM 50 or the signal that is contained in the abnormality information and that indicates that main microcomputer 10 operates abnormally.

Control Processing Performed by Sub-Microcomputer

Figure 5:
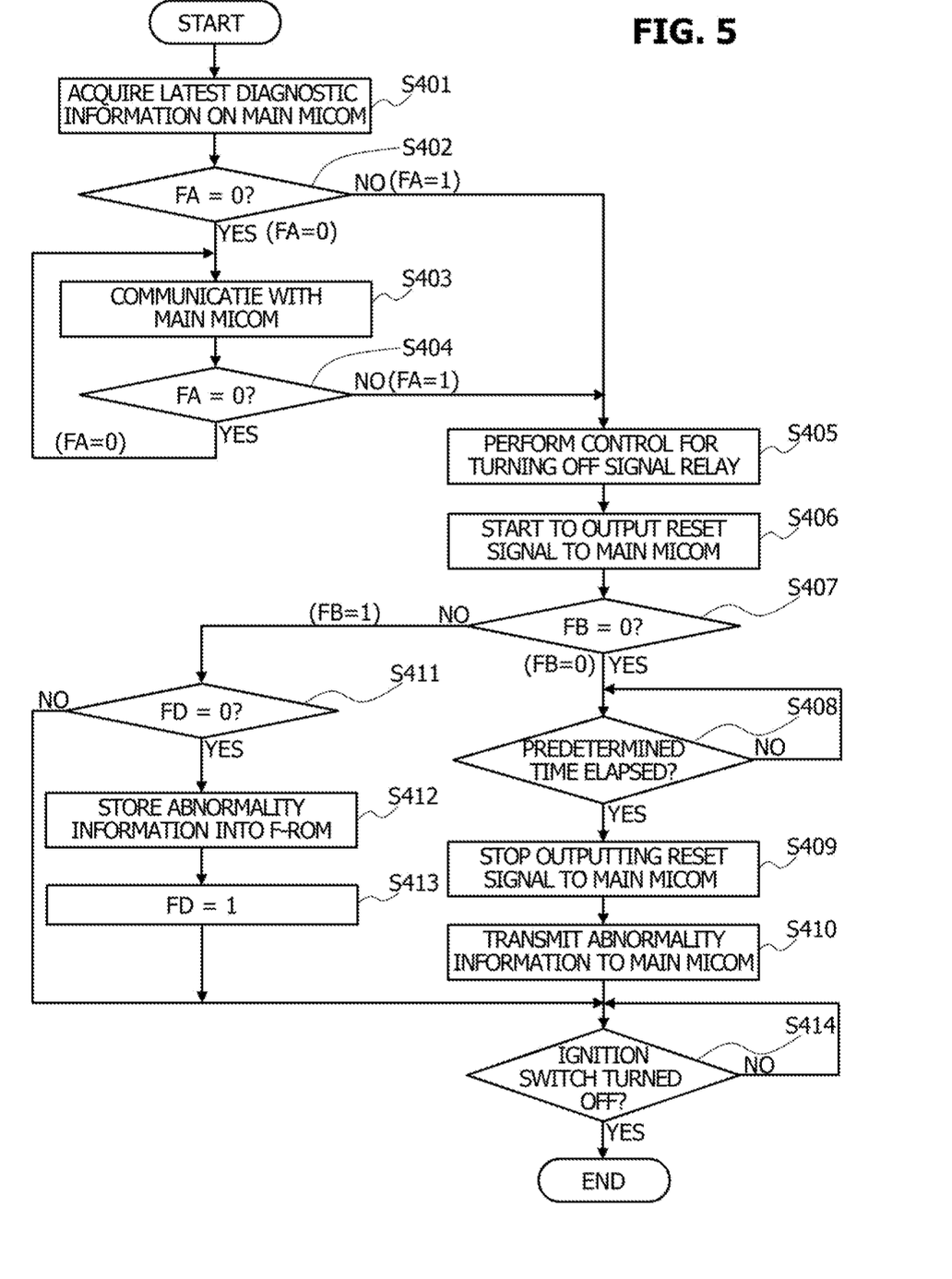
FIG. 5 is a flowchart of processing performed by a sub-microcomputer of the in-vehicle electronic control unit.

FIG. 5 is a flowchart of control processing performed by CPU 23 of sub-microcomputer 20, which is triggered when ignition switch 3 is turned on so that the power supply voltage starts to be supplied from power supply circuit 30 to main microcomputer 10 and sub-microcomputer 20.

In step S401, CPU 23 of sub-microcomputer 20 acquires the latest diagnostic information on main microcomputer 10. How and what specific information is acquired as the latest diagnostic information on main microcomputer 10 in step S401 are as described above in relation to step S101, and thus, description thereof will be omitted.

In step S402, based on the diagnostic information acquired in step S401, CPU 23 of sub-microcomputer 20 determines whether the operating state flag FA has a value indicating that main microcomputer 10 operates normally (FA=0, for example), i.e., determines whether main microcomputer 10 operates normally. When CPU 23 of sub-microcomputer 20 determines that the operating state flag FA has the value indicating that main microcomputer 10 operates normally (FA=0, YES), the operation proceeds to step S403 so that CPU 23 monitors the operating state of main microcomputer 10. When CPU 23 of sub-microcomputer 20 determines that the operating state flag FA has the value indicating that main microcomputer 10 operates abnormally (FA=1, NO), the operation skips steps S403 and S404 and proceeds to step S405, thereby skipping the monitoring of the operating state of main microcomputer 10.

In step S403, CPU 23 of sub-microcomputer 20 communicates with main microcomputer 10 through input/output unit 22, and receives the diagnostic information resulting from the abnormality diagnostic procedure performed by CPU 13 of main microcomputer 10.

In step S404, based on the diagnostic information acquired in step S403, CPU 23 of sub-microcomputer 20 determines whether the operating state flag FA has a value indicating that main microcomputer 10 operates normally (FA=0, for example), i.e., determines whether main microcomputer 10 operates normally. When CPU 23 of sub-microcomputer 20 determines that the operating state flag FA has the value indicating that main microcomputer 10 operates normally (FA=0, YES), the operation returns to step S403 and CPU 23 continues to monitor the operating state of main microcomputer 10. When CPU 23 of sub-microcomputer 20 determines that the operating state flag FA has the value indicating that main microcomputer 10 operates abnormally (FA=1, NO), the operation proceeds to step S405.

In step S405, CPU 23 of sub-microcomputer 20 outputs, to signal relay 40 through input/output unit 22, the control signal SR1 for turning off signal relay 40 (performs control for turning off signal relay). By doing so, when determining that main microcomputer 10 operates abnormally, CPU 23 blocks the control signal SACT output from main microcomputer 10 to actuator 4 so as to prevent or reduce malfunction of actuator 4.

In step S406, CPU 23 of sub-microcomputer 20 outputs the reset signal SRES to main microcomputer 10 through input/output unit 22.

In step S407, based on the diagnostic information acquired in step S401 or S403, CPU 23 of sub-microcomputer 20 determines whether the executable/inexecutable flag FB indicates the processing-executable abnormal state or the processing-inexecutable abnormal state. That is, CPU 23 of sub-microcomputer 20 determines whether abnormally operating main microcomputer 10 still has the ability to perform the abnormality response processing. When CPU 23 of sub-microcomputer 20 determines that the executable/inexecutable flag FB has the value indicating the processing-executable abnormal state (FB=0, YES), the operation proceeds to step S408. When CPU 23 of sub-microcomputer 20 determines that the executable/inexecutable flag FB has the value indicating the processing-inexecutable abnormal state (FB=1, NO), the operation proceeds to step S411.

In step S408, CPU 23 of sub-microcomputer 20 determines whether time elapsed from the output of the reset signal SRES in step S406 reaches the predetermined time, which is an estimated time required for initializing main microcomputer 10. When CPU 23 of sub-microcomputer 20 determines that the elapsed time reaches the predetermined time (YES), the operation proceeds to step S409. When CPU 23 of sub-microcomputer 20 determines that the elapsed time has not reached the predetermined time (NO), the operation in step S408 is repeated.

In step S409, CPU 23 of sub-microcomputer 20 stops outputting the reset signal SRES to main microcomputer 10.

In step S410, CPU 23 of sub-microcomputer 20 transmits, to main microcomputer 10 through input/output unit 22, the abnormality information received from main microcomputer 10 and temporarily stored in RAM 24 in step S401 or S403. Then, the operation proceeds to step S414. Note that CPU 23 of sub-microcomputer 20 transmits the abnormality information to main microcomputer 10 after confirming that main microcomputer 10 has restarted and is ready to receive the abnormality information.

In step S411, CPU 23 of sub-microcomputer 20 determines whether a second execution flag FD has a value indicating that no abnormality information is stored in flash ROM 21 (FD=0, for example). Here, the second execution flag FD, which indicates whether abnormality information is stored in flash ROM 21, is stored in flash ROM 21 and read from flash ROM 21 every time the operation in step S411 is performed. When determining that the second execution flag FD indicates 0 (YES), the operation proceeds to step S412 and CPU 23 of sub-microcomputer 20 stores the abnormality information in flash ROM 21. Then, the operation proceeds to step S413 and CPU 23 of sub-microcomputer 20 sets the second execution flag FD to a value indicating that the abnormality information has been stored (FD=1, for example). When CPU 23 of sub-microcomputer 20 determines that the second execution flag FD indicates 1 (NO), the operation proceeds to step S414.

In step S414, CPU 23 of sub-microcomputer 20 determines whether ignition switch 3 is turned off in the same manner as in step S104. When CPU 23 of sub-microcomputer 20 determines that ignition switch 3 is turned off (YES), the control processing performed by CPU 23 of sub-microcomputer 20 ends. When CPU 23 of sub-microcomputer 20 determines that ignition switch 3 is not turned off (NO), the operation of step S414 is repeated.

Throughout the course from step S405 to the end of the control processing, CPU 23 of sub-microcomputer 20 continuously outputs the control signal SR1 to signal relay 40 without interruption so that the control signal SACT from main microcomputer 10 to actuator 4 is kept blocked. By doing so, CPU 23 prevents or reduces malfunction of actuator 4 when it is determined that main microcomputer 10 operates abnormally. In addition, throughout the course from step S406 to the end of the control processing through the path including step S411 or steps S411 to S413, CPU 23 of sub-microcomputer 20 continuously outputs the reset signal SRES to main microcomputer 10 without interruption. Accordingly, when main microcomputer 10 is in the processing-inexecutable abnormal state, main microcomputer 10 is kept initialized and prevented from operating further on.

In ECU 1 configured as above, when main microcomputer 10 operates abnormally, sub-microcomputer 20 blocks the control signal SACT that is output to actuator 4 and thereby prevents or reduces malfunction of actuator 4. At the same time, sub-microcomputer 20 also outputs the reset signal SRES to main microcomputer 10 so as to initialize main microcomputer 10. Furthermore, when sub-microcomputer 20 further determines that abnormally operating main microcomputer 10 still has the ability to perform the abnormality response processing including storing the abnormality information to EEPROM 50 and performing the abnormality response communication, sub-microcomputer 20 stops outputting the reset signal SRES to main microcomputer 10 so as to restart main microcomputer 10. This causes main microcomputer 10 to perform the abnormality response processing. Thus, in this case, main microcomputer 10 not only stores the abnormality information into EEPROM 50, but also responds to an inquiry on the operating state of main microcomputer 10 from any of ECUs 6 and diagnostic device 7 by transmitting, to this relevant ECU 6 or diagnostic device 7, information on the operating state of main microcomputer 10. Thus, ECU 1 provides an improved function to notify external entities of an abnormality of ECU 1. In particular, this allows ECUs 6 configured to control actuators other than that of transmission mechanism 5 to control their corresponding actuators so as to respond to the abnormality of ECU 1. This facilitates to ensure the driving safety of the vehicle.

On the other hand, when sub-microcomputer 20 further determines that abnormally operating main microcomputer 10 loses the ability to perform the abnormality response processing, sub-microcomputer 20 continues to output the reset signal SRES to main microcomputer 10 so as not to restart main microcomputer 10, and stores the abnormality information into flash ROM 21. Thus, when main microcomputer 10 of ECU 1 is in the processing-inexecutable abnormal state and thus, ECU 1 is disassembled, for example, and analyzed to check the cause of the abnormality, the cause of the abnormality may be determined based on the abnormality information retrieved from flash ROM 21 by using a flash ROM rewriting unit 9 shown in FIG. 1 connected to flash ROM 21.

In the above embodiment, when determining that main microcomputer 10 operates abnormally, CPU 13 of main microcomputer 10 or CPU 23 of sub-microcomputer 20 may also notify the driver of the abnormality. In this event, CPU 13 of main microcomputer 10 or CPU 23 of sub-microcomputer 20 may provide the driver with notifications at different alert levels depending on whether main microcomputer 10 is in the processing-executable abnormal state or in the processing-inexecutable abnormal state. For example, when it is determined that main microcomputer 10 is in the processing-executable abnormal state, an indicator lamp may stay illuminated or flash to provide a visual alert. On the other hand, when it is determined that main microcomputer 10 is in the processing-inexecutable abnormal state, an auditory alert may be provided in addition to such a visual alert.

In the above embodiment, when determining that main microcomputer 10 operates abnormally, CPU 23 of sub-microcomputer 20 blocks the control signal SACT that is output to actuator 4. Alternatively, however, CPU 23 of sub-microcomputer 20 may be configured not to block the control signal SACT that is forcibly output to actuator 4 from main microcomputer 10 so as to put the vehicle into limp home operation. For example, CPU 13 of main microcomputer 10 may forcibly output the control signal SACT to control actuator 4 so that transmission mechanism 5 shifts to a lower gear. In this case, CPU 23 of sub-microcomputer 20 may be prevented from blocking this forcible control signal SACT output from main microcomputer 10 to actuator 4.

Although FIG. 1 shows an example configuration of main microcomputer 10 and sub-microcomputer 20, this configuration is merely illustrative and the present invention is not limited thereto. The present invention may also be applied to different configurations. For example, ROM 11 of main microcomputer 10 may be an electrically rewritable non-volatile memory such as an EEPROM or a flash memory. In an embodiment in which ROM 11 is a rewritable non-volatile memory, the abnormality information can be stored in ROM 11, and this eliminates the need for providing EEPROM 50 external to main microcomputer 10.

Furthermore, the present invention may also be implemented using ECU 1 that includes a multi-core CPU instead of main microcomputer 10 and sub-microcomputer 20. In such an embodiment, a core of the multi-core CPU serves as a control circuit corresponding to main microcomputer 10, and another core of the multi-core CPU serves as a monitoring circuit corresponding to sub-microcomputer 20. Alternatively, sub-microcomputer 20 of ECU 1 may be replaced with an application specific integrated circuit (ASIC) having the functions of sub-microcomputer 20.

When main microcomputer 10 is determined to operate abnormally and then replaced with a properly operating one, diagnostic device 7 connected to the new main microcomputer 10 may perform the abnormality diagnostic procedure on the new main microcomputer 10. Then, when diagnostic device 7 diagnoses that the new main microcomputer 10 operates normally as a result of the abnormality diagnostic procedure on the new main microcomputer 10, the diagnostic information stored in EEPROM 50 may be overwritten with the normality information. In some cases, the old main microcomputer 10 may have been determined to be in the processing-inexecutable abnormal state before diagnostic device 7 diagnoses that the new main microcomputer 10 operates normally as a result of the abnormality diagnostic procedure on the new main microcomputer 10. In such a case, after diagnostic device 7 performs the abnormality diagnostic procedure on the new main microcomputer 10, CPU 13 of the new main microcomputer 10 may overwrite the abnormality information stored in flash ROM 21 of sub-microcomputer 20 with the normality information. This enables CPU 13 of the new main microcomputer 10 to perform the normal-state processing (step S103) in the control processing.

In some cases, when main microcomputer 10 is determined to be in the processing-executable abnormal state, ignition switch 3 may be turned off before CPU 13 of main microcomputer 10 finishes storing the abnormality information into EEPROM 50 through the abnormality response processing. In this case, CPU 23 of sub-microcomputer 20 may perform the self shut-off processing to transfer and store, into flash ROM 21 of sub-microcomputer 20, the abnormality information that is temporarily stored in RAM 24.

In the above embodiment, CPU 13 of main microcomputer 10 loads the program for normal state from ROM 11 when it determines that main microcomputer 10 operates normally, and loads the program for abnormal state from ROM 11 when it determines that main microcomputer 10 operates abnormally. Alternatively, however, CPU 13 of main microcomputer 10 may load both the program for normal state and the program for abnormal state beforehand at the start of the control processing.

REFERENCE SYMBOL LIST

1 ECU
4 Actuator
6 Other ECUs
7 Diagnostic device
10 Main microcomputer
12 Input/output unit
13 CPU
20 Sub-microcomputer
21 Flash ROM
23 CPU
40 Signal relay
50 EEPROM
SACT Control signal
SRES Reset signal
FA Operating state flag
FB Executable/inexecutable flag

The invention claimed is:
1. An in-vehicle electronic control unit comprising:
a control circuit configured to control an actuator mounted in a vehicle and to perform a self-diagnostic procedure;
a monitoring circuit operably connected to the control circuit and configured to monitor an operating state of the control circuit based on diagnostic information resulting from the self-diagnostic procedure; and
a relay controlled by, the monitoring circuit and configured to either allow or block a control signal output from the control circuit to the actuator;
a first memory operably connected to the control circuit and the monitoring circuit and configured to store and maintain the diagnostic information when the monitoring circuit makes an abnormality determination that the control circuit operates abnormally; and
a second memory operably connected to the control circuit and the monitoring circuit and configured to store and maintain the diagnostic information when the monitoring circuit makes a normality determination that the control circuit operates normally;

wherein the monitoring circuit is configured to make the abnormality determination when the diagnostic information satisfies a predetermined condition and to make the normality determination when the diagnostic information does not satisfy the predetermined condition, wherein following the abnormality determination, the monitoring circuit is further configured to block the control signal, restart the control circuit, and communicate with an external entity, and wherein the first memory is volatile memory and the second memory is a first non-volatile memory, and wherein the monitoring circuit is further configured so that, when an ignition switch of the vehicle is turned off before the control circuit finishes storing the diagnostic information into the first non-volatile memory, the monitoring circuit performs self shut-off processing to transfer and store the diagnostic information from the volatile memory into a second non-volatile memory.

2. The in-vehicle electronic control unit according to claim 1, wherein the predetermined condition is that the control circuit that operates abnormally still has an ability to perform the abnormality response processing.

3. The in-vehicle electronic control unit according to claim 2, wherein when a portion of the control circuit other than any portion of an arithmetic unit has an abnormality, the control circuit still has the ability to perform the abnormality response processing.

4. The in-vehicle electronic control unit according to claim 1, wherein the control circuit is configured to be enabled to perform normal-state processing when the diagnostic information stored in the first non-volatile memory is overwritten with diagnostic information indicating that the control circuit operates normally.

5. The in-vehicle electronic control unit according to claim 4, wherein the control circuit is configured to be connectable to an external diagnostic device and replaceable with a new control circuit, and wherein the control circuit is configured so that, when the control circuit is replaced with the new control circuit, and the external diagnostic device performs a diagnostic procedure on the new control circuit and determines that the new control circuit operates normally, the diagnostic information stored in the first non-volatile memory is overwritten with diagnostic information indicating that the new control circuit operates normally.

6. A method for abnormality response processing of an in-vehicle electronic control unit, the method comprising:

causing a control circuit configured to control an actuator mounted in a vehicle to perform a self-diagnostic procedure;

causing, when a monitoring circuit operably connected to the control circuit and configured to monitor an operating state of the control circuit based on diagnostic information resulting from the self-diagnostic procedure determines that the control circuit operates normally or abnormally, the monitoring circuit either allows or blocks a control signal output from the control circuit to the actuator;

causing a first memory operably connected to the control circuit and the monitoring circuit and configured to store and maintain the diagnostic information when the monitoring circuit makes an abnormality determination that the control circuit operates a abnormally;

causing a second memory operably connected to the control circuit and the monitoring circuit and configured to store and maintain the diagnostic information when the monitoring circuit makes a normality determination that the control circuit operates normally;

wherein the monitoring circuit is configured to make the abnormality determination when the diagnostic information satisfies a predetermined condition and to make the normality determination when the diagnostic information does not satisfy the predetermined condition, wherein following the abnormality determination, the monitoring circuit is further configured to block the control signal, restart the control circuit and communicate with an external entity, and wherein the first memory is volatile memory and the second memory is a first non-volatile memory, and configuring the monitoring circuit so that, when an ignition switch of the vehicle is turned off before the control circuit finishes storing the diagnostic information into the first non-volatile memory, the monitoring circuit performs self shut-off processing to transfer and store the diagnostic information from the volatile memory into a second non-volatile memory.

* * * * *